US009836093B2

(12) United States Patent
Chen et al.

(10) Patent No.: US 9,836,093 B2
(45) Date of Patent: Dec. 5, 2017

(54) ELECTRONIC APPARATUS WITH A TOUCH CONTROL SCREEN

(71) Applicant: Wistron Corporation, New Taipei (TW)

(72) Inventors: Yen-Chi Chen, New Taipei (TW); Hsiu-Ming Yeh, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 393 days.

(21) Appl. No.: 14/592,851

(22) Filed: Jan. 8, 2015

(65) Prior Publication Data

US 2016/0004366 A1 Jan. 7, 2016

(30) Foreign Application Priority Data

Jul. 4, 2014 (TW) .............................. 103123202 A

(51) Int. Cl.
*G06F 1/16* (2006.01)
(52) U.S. Cl.
CPC .......... *G06F 1/1681* (2013.01); *G06F 1/1679* (2013.01); *G09G 2300/0404* (2013.01)
(58) Field of Classification Search
None
See application file for complete search history.

(56) References Cited

U.S. PATENT DOCUMENTS

| 8,204,556 | B2* | 6/2012 | Park | H04M 1/0208 |
| | | | | 455/575.1 |
| 8,654,095 | B1* | 2/2014 | Cho | G06F 3/0412 |
| | | | | 345/173 |
| 2009/0144934 | A1* | 6/2009 | Kitagawa | G06F 1/1616 |
| | | | | 16/320 |
| 2010/0058557 | A1* | 3/2010 | Wang | G06F 1/1616 |
| | | | | 16/320 |
| 2010/0071157 | A1* | 3/2010 | Wang | G06F 1/1616 |
| | | | | 16/297 |
| 2010/0245209 | A1* | 9/2010 | Miller | G06F 1/1618 |
| | | | | 345/1.3 |
| 2012/0106078 | A1* | 5/2012 | Probst | G06F 1/1616 |
| | | | | 361/679.56 |
| 2012/0218701 | A1* | 8/2012 | Thomas | A47B 43/00 |
| | | | | 361/679.22 |
| 2013/0077236 | A1* | 3/2013 | Becze | G06F 3/1438 |
| | | | | 361/679.56 |
| 2014/0098474 | A1* | 4/2014 | Bhowmik | G06F 1/1616 |
| | | | | 361/679.01 |
| 2014/0376180 | A1* | 12/2014 | Chen | G06F 1/1681 |
| | | | | 361/679.55 |
| 2016/0246335 | A1* | 8/2016 | Senatori | G06F 1/162 |

* cited by examiner

*Primary Examiner* — Kent Chang
*Assistant Examiner* — William Lu
(74) *Attorney, Agent, or Firm* — Blakely Sokoloff Taylor & Zafman LLP

(57) ABSTRACT

An electronic apparatus includes a host, a touch control screen, a pivot unit, a retaining unit, and a control unit. The retaining unit includes a driving member electrically operable to drive a retaining member to move between a retaining position and a non-retaining position. The control unit controls, according to an operation signal corresponding to a status of the touch control screen, the driving member to drive the retaining member to either move to the retaining position for resisting rotation of the touch control screen relative to the host, or move to the non-retaining position for not resisting rotation of the touch control screen relative to the host.

9 Claims, 7 Drawing Sheets

ELECTRONIC APPARATUS WITH A TOUCH CONTROL SCREEN

CROSS REFERENCE TO RELATED APPLICATION

This application claims priority of Taiwanese Patent Application no. 103123202 filed on Jul. 4, 2014, the entire disclosure of which is incorporated herein by reference.

BACKGROUND OF THE INVENTION

1. Field of the Invention

The invention relates to an electronic apparatus, more particularly to an electronic apparatus with a touch control screen.

2. Description of the Related Art

Current consumer electronic apparatus, such as smart phones, table personal computers, global positioning systems (GPS), etc., are designed to be light-weight, slim, short and miniaturized. Under such a premise, input devices such as a keyboard, a mouse, etc., are being replaced by screens having a touch control function. As such, screens of some conventional laptop computers are equipped with touch control functionality.

Referring to FIG. 1, a conventional notebook computer 1 includes a host 11, a touch control screen 12 and two pivot units 13.

The touch control screen 12 is connected pivotably to the host 11 through the pivot units 13.

Each of the pivot units 13 has a first connecting base 131 connected to the host 11, a first hollow pivot body 132 connected to the first connecting base 131, a second connecting base 133 connected to the touch control screen 12, and a pivot shaft 134. The pivot shaft 134 extends from one end of the second connecting base 133 in a direction towards the first pivot body 132 and is fittingly coupled to the first pivot body 132. Therefore, the touch control screen 12 can be rotated relative to the host 11 between a folded position and an expanded position. In the folded position, the touch control screen 12 is disposed horizontally and is adjacent to the host 11. In the expanded position, the touch control screen 12 forms an angle relative to the host 11.

The touch control screen 12 is supported in the expanded position by a torsion force provided by friction between the pivot shafts 134 and the first pivot bodies 132 to form an angle relative to the host 11. The torsion force has a constant value, and does not change with different angles formed between the touch control screen 12 and the host 11. However, the user has to touch the touch control screen 12 when using the conventional notebook computer 1, and if the magnitude of the torsion force is smaller than that of a force applied by the user when touching the touch control screen 12, the touch control screen 12 will rotate away from the host 11. Thus, the user may have to manually adjust the angle of the touch control screen 12 back to a suitable one, causing inconvenience for the user.

On the other hand, if the friction between the pivot shaft 134 and the first pivot body 132 is increased such that the magnitude of the torsion force is larger than that of a force normally applied by the user when touching the touch control screen 12, then the touch control screen 12 does not easily rotate relative to the host 11. However, the user has to exert a rather large force on the touch control screen 12 to rotate the touch control screen 12, which also causes inconvenience for the user.

SUMMARY OF THE INVENTION

An object of the present invention is to provide a electronic apparatus having a touch control screen that provides convenience for a user.

According to the present invention, there is provided an electronic apparatus having a touch control screen, comprising:

a host;

a touch control screen;

a pivot unit including a first pivot member connected to one of the host and the touch control screen, and a second pivot member connected to the other one of the host and the touch control screen, the first pivot member and the second pivot member being coupled pivotally and enabling the touch control screen to be pivoted relative to the host between a folded position and an expanded position;

a retaining unit disposed between the first pivot member and the second pivot member and including a driving member and a retaining member, the driving member being electrically operable to drive the retaining member to move between a retaining position and a non-retaining position, the retaining member abutting against one of the first pivot member and the second pivot member in the retaining position, and being freed from abutment with the one of the first pivot member and the second pivot member in the non-retaining position; and a control unit coupled electrically to the touch control screen and the driving member, the control unit controlling, according to an operation signal corresponding to a status of the touch control screen, the driving member to drive the retaining member to either move to the retaining position for resisting rotation of the touch control screen relative to the host, or move to the non-retaining position for not resisting rotation of the touch control screen relative to the host.

BRIEF DESCRIPTION OF THE DRAWINGS

Other features and advantages of the present invention will become apparent in the following detailed description of two embodiments with reference to the accompanying drawings, of which.

DETAILED DESCRIPTION OF THE EMBODIMENTS

Figure 1:
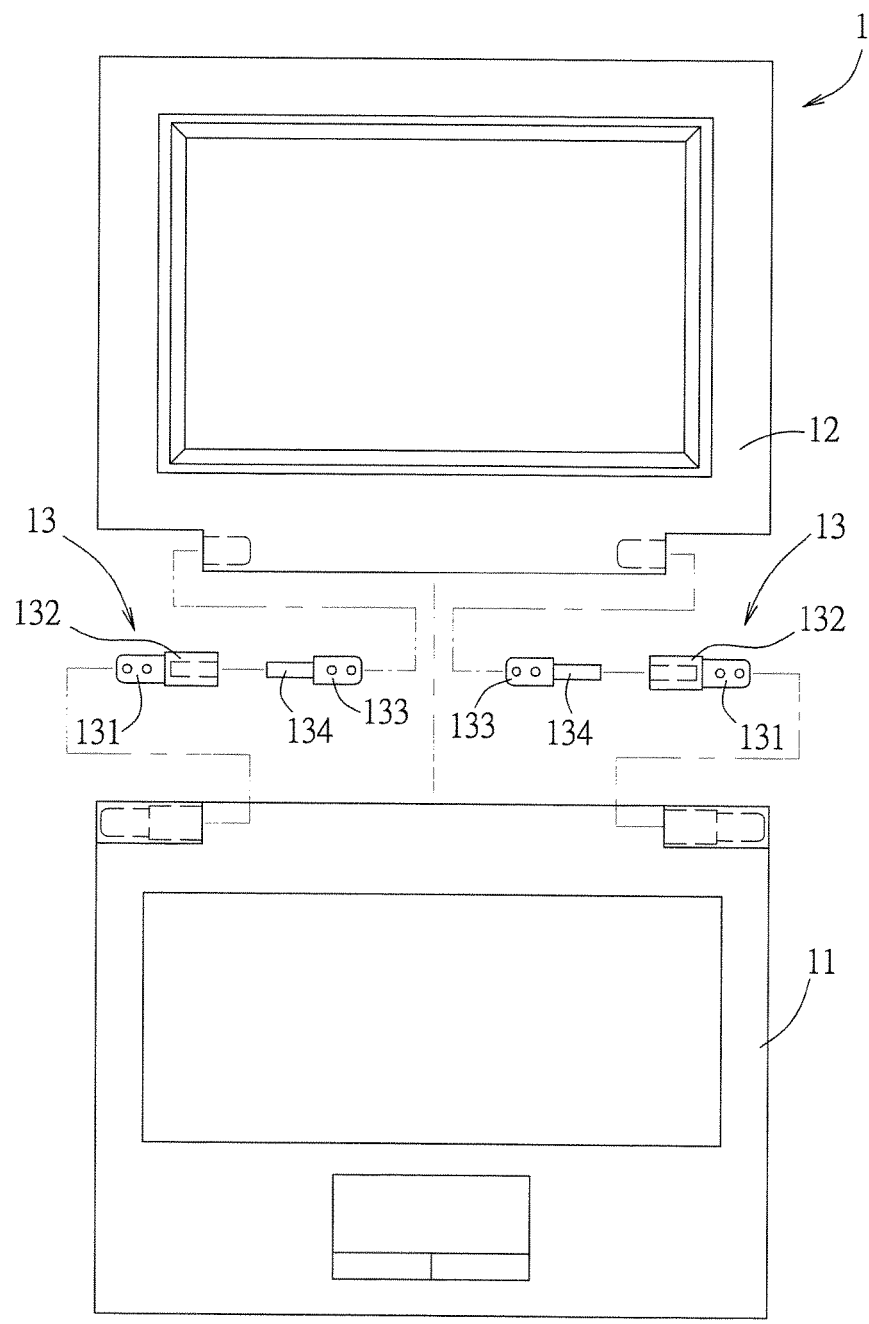
FIG. 1 is an exploded view of a conventional notebook computer.

Before the present invention is described in greater detail with reference to the accompanying embodiments, it should be noted herein that like elements are denoted by the same reference numerals throughout the disclosure.

Figure 2:
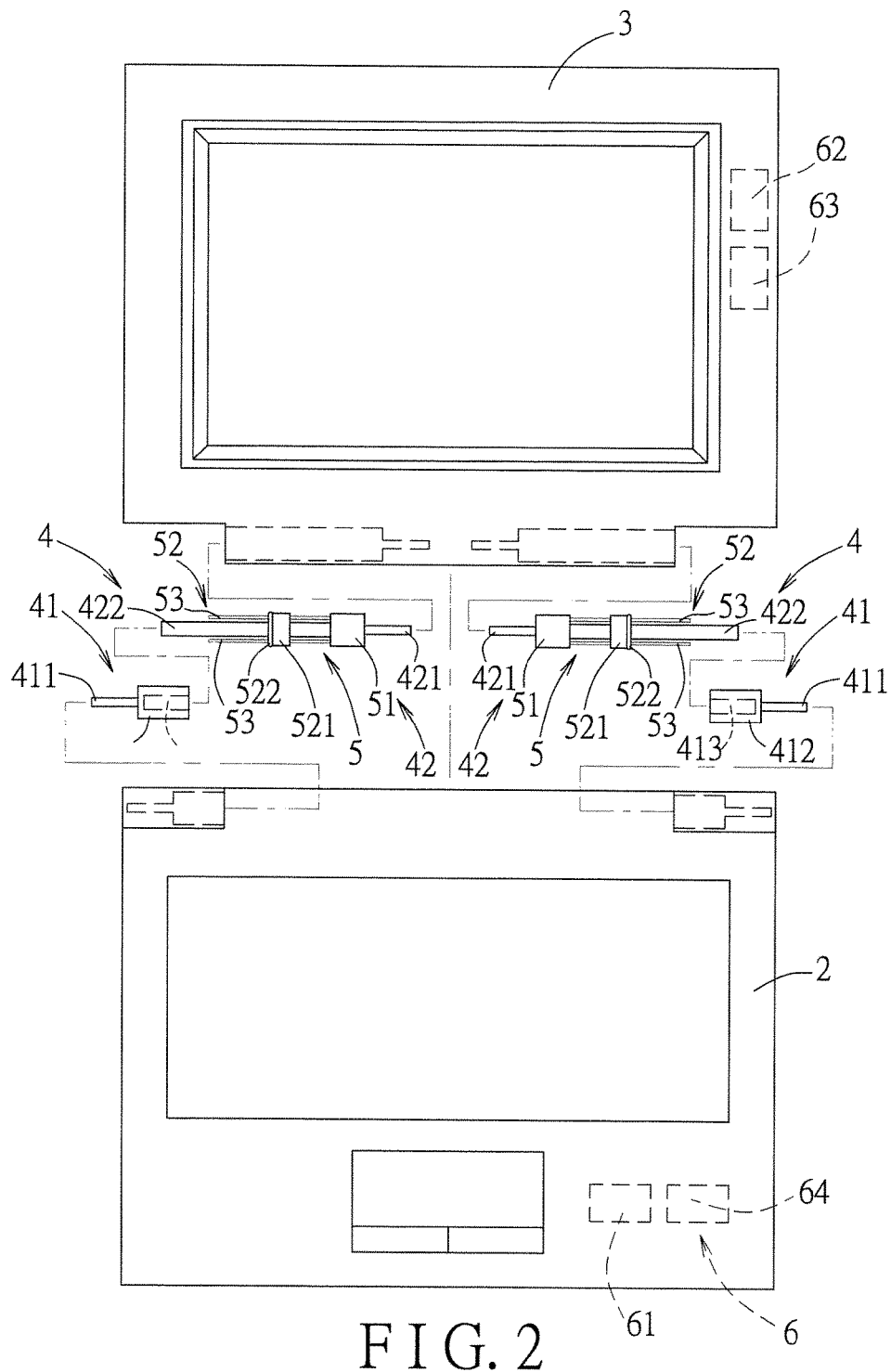
FIG. 2 is an exploded view of the first embodiment of an electronic apparatus with a touch control screen according to the present invention.
Figure 3:
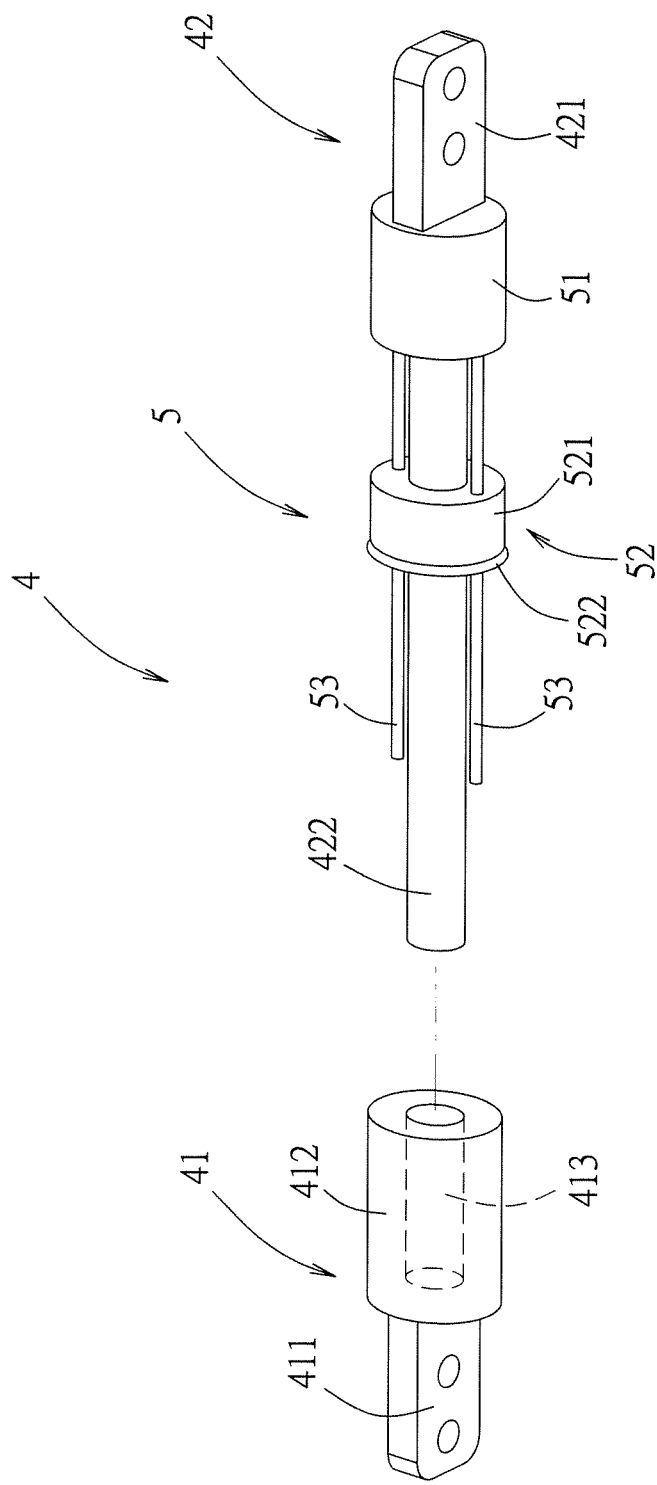
FIG. 3 is an exploded perspective view for illustrating coupling between a pivot unit and a retaining unit in the first embodiment of the present invention.

Referring to FIGS. 2 and 3, the first embodiment of an electronic apparatus having a touch control screen of the present invention is shown to comprise a host 2, a touch control screen 3, a pair of pivot units 4, a pair of retaining units 5 and a control unit 6. The electronic apparatus can be a notebook computer or any other cover-liftable type of electronic apparatus having a hinge mechanism.

The two pivot units 4 are disposed between the host 2 and the touch control screen 3. However, in other embodiments, the number of the pivot units 4 may be only one. Each of the pivot units 4 includes a first pivot member 41 and a second pivot member 42. The first pivot member 41 has a first connecting base 411 and a pivot body 412. The first connecting base 411 is connected to the host 2, and the pivot body 412 is connected to the first connecting base 411 and is formed with a shaft hole 413. The second pivot member 42 has a second connecting base 421 connected to the touch control screen 3, and a pivot shaft 422. The pivot shaft 422 has one end portion connected to the second connecting base 421, and another end portion extending fittingly and rotatably into the shaft hole 413 of the pivot body 412. In view of the right sleeving engagement between the pivot shaft 422 and the pivot body 412 that the touch control screen 3 can be pivoted relative to the host 2 between a folded position and an expanded position. In the folded position, the touch control screen 3 is disposed horizontally and is adjacent to the host 2. In the expanded position, the touch control screen 3 forms an angle relative to the host 2 for a user to look at and perform touch control operations on the touch control screen 3.

Each of the retaining units 5 includes a driving member 51 sleeved on a corresponding pivot shaft 422 and disposed adjacent to a corresponding second connecting base 421, a pair of retaining shafts 53 (each extending from an end of the driving member 51 towards the a corresponding pivot body 412), and a retaining member 52. In this embodiment, the driving member 51 is an electromagnet. The retaining member 52 includes a magnet 521 sleeved on a corresponding pivot shaft 422 and the retaining shafts 53, and a washer 522 disposed at one side of the magnet 521 that faces a corresponding pivot body 412. The washer 522 is made of a material having a high friction coefficient, such as rubber. In other embodiments, the number of the retaining units 5 may only be 1. That is to say, only one of the second pivot members 42 is provided with a retaining unit 5.

Figure 4:
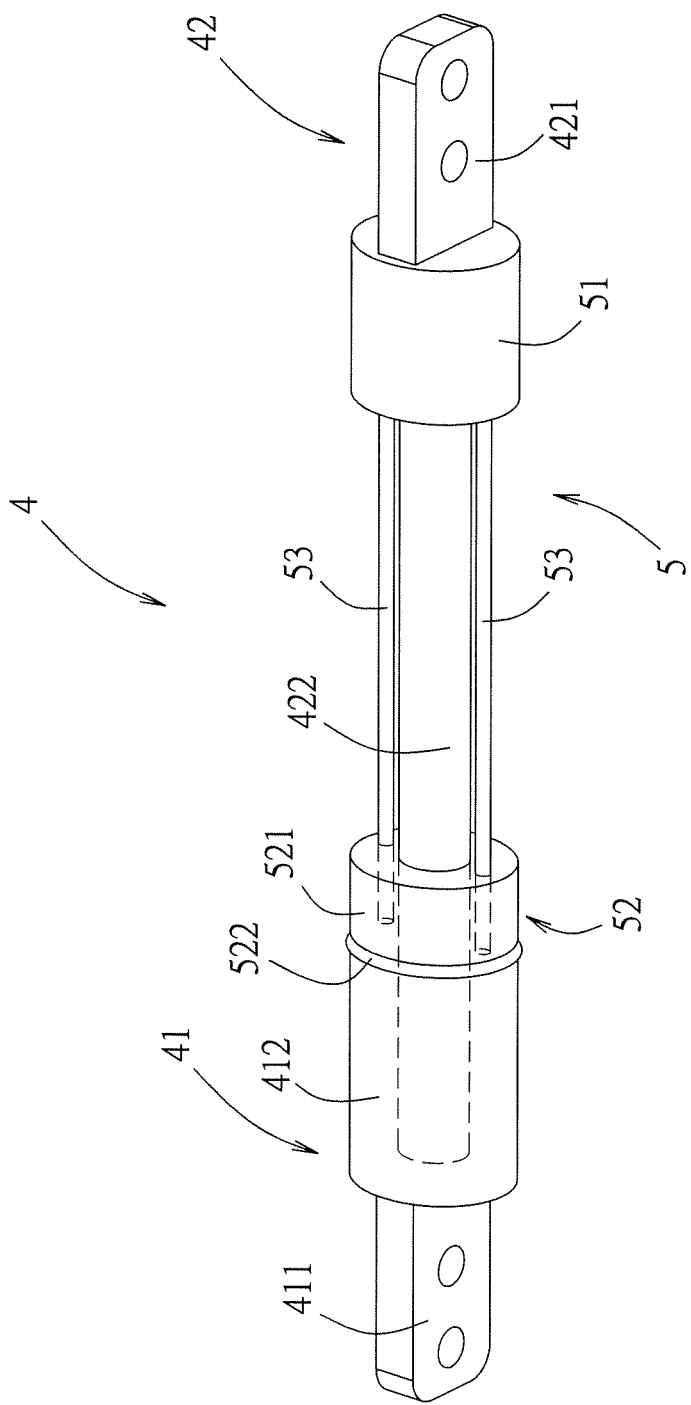
FIG. 4 is a perspective view illustrating a retaining member of the retaining unit of the first embodiment in a retaining position.
Figure 5:
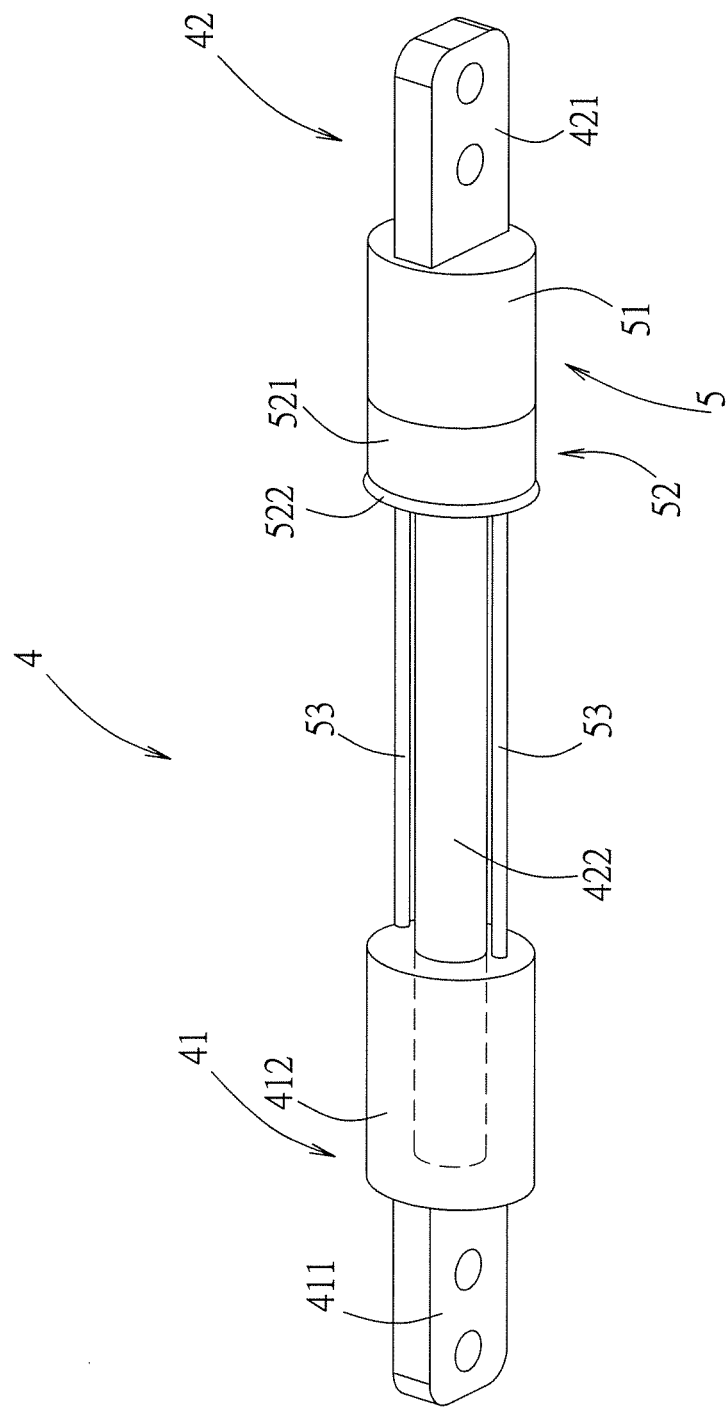
FIG. 5 is a perspective view similar to FIG. 4 but illustrating the retaining member of the first embodiment in a non-retaining position.

Referring to FIGS. 2, 4 and 5, the control unit 6 includes a first controller 61, a gravity sensor 62, a second controller 63 and a position sensor 64.

The first controller 61 is disposed at the host 2, and is coupled electrically to each of the driving members 51 and to the touch control screen 3. The first controller 61 is operable to control the driving member 51 to generate a magnetic force (an attractive force or a repulsive force) for driving the retaining member 52 to move between a retaining position and a non-retaining position. When the retaining member 52 is in the retaining position as shown in FIG. 4, the driving member 51 generates a repulsive force to push the magnet 521 of the retaining member 52 to move along the corresponding pivot shaft 422 in a direction away from the driving member 51, such that the washer 522 having a high friction coefficient abuts against the pivot body 412 to result in a larger friction force that works against rotation of the pivot shaft 422 relative to the pivot body 412. By such virtue, the touch control screen 3 cannot be easily rotated relative to the host 2 when the touch control screen 3 is touched or acted upon by an external force. The retaining shafts 53 serve to ensure that the retaining member 52 does not rotate with the pivot body 412.

When the retaining member 52 is in the non-retaining position as shown in FIG. 5, the driving member 51 generates an attractive force on the retaining member 52 to attract the magnet 521 to move in a direction away from the pivot body 412, such that the retaining member 52 is freed from abutment with the pivot body 412. In this non-retaining position, the user only needs to overcome a friction force between the pivot body 412 and the pivot shaft 422 in order to easily rotate the touch control screen 3 relative to the host 2.

The gravity sensor 62 (also called G-sensor) is disposed in the touch control screen 3 and is coupled electrically with the first controller 61 and is operable to determine an angle of rotation of the touch control screen 3. When the gravity sensor 62 detects angular rotation of the touch control screen 3, a rotated angle signal corresponding to the detected angular rotation is generated by the gravity sensor 62 and sent to the first controller 61. According to the rotated angle signal, if the first controller 61 determines that the touch control screen 3 is rotated by an angle larger than a predetermined value, such as 10 degrees (which can be preset and varied by the user), the first controller 61 determines that the user intends to rotate the touch control screen 3. At this moment, if the retaining member 52 is in the retaining position, the first controller 61 controls the driving member 51 to generate an attractive force for driving the retaining member 52 to move to the non-retaining position, as shown in FIG. 5, such that the user can easily rotate the touch control screen 3 relative to the host 2.

The second controller 63 is disposed in the touch control screen 3 and is coupled electrically to the first controller 61 using a General Purpose Input/Output interface (GPIO, which is not shown in the Figures). The second controller 63 executes a firmware recorded therein for monitoring a status of the touch control screen 3. When the user touches the touch control screen 3 by hand, the touch control screen 3 transmits an operation signal (touch control signal) to the second controller 63. Subsequently, the second controller 63 sends the touch control signal to the first controller 61, such that the first controller 61 will control the driving member 51 to generate a repulsive force so as to drive the retaining member 52 to move to and remain in the non-retaining position, as shown in FIG. 4. By such virtue, wobbling attributed to the user touching the touch control screen is significantly reduced. Moreover, the first controller 61 can also be configured in a manner that, if the first controller 61 does not receive any touch control signal from the second controller 63 for a time period (such as 3~5 seconds), which implies that the touch control screen 3 is in an idle state, the first controller 61 will control the driving member 51 to produce an attractive force for driving the retaining member 52 to move to the non-retaining position, such that the user is able to easily rotate the touch control screen 3. In general, the predetermined value of time period for determining the idle state of the touch control screen 3 may be from 3 to 5 seconds. However, the value can be configured by the user.

In this embodiment, the position sensor 64 is a holding sensor, and is disposed in the host 2 and is coupled electrically to the first controller 61 (the electrical coupling is not shown in FIG. 2) for sensing whether or not the touch control screen 3 is disposed in the folded position. If the touch control screen 3 is disposed in the folded position, the position sensor 64 sends a signal to the first controller 61, such that first controller 61 will control the driving member 51 to generate an attractive force for driving the retaining member 52 to move to the non-retaining position, thus enabling the user to easily rotate the touch control screen 3 from the folded position to the expanded position.

Figure 6:
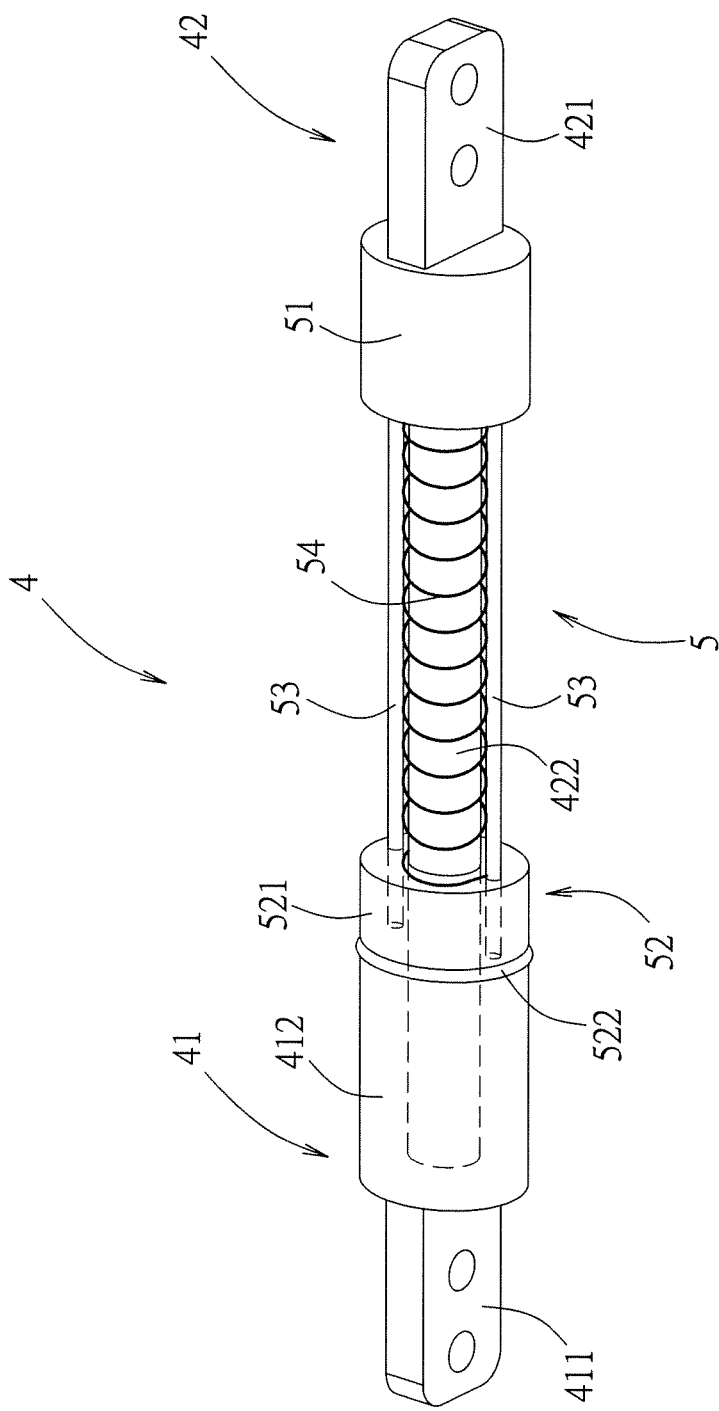
FIG. 6 is a perspective view illustrating a retaining member of the retaining unit of a second embodiment of the present invention in a retaining position.
Figure 7:
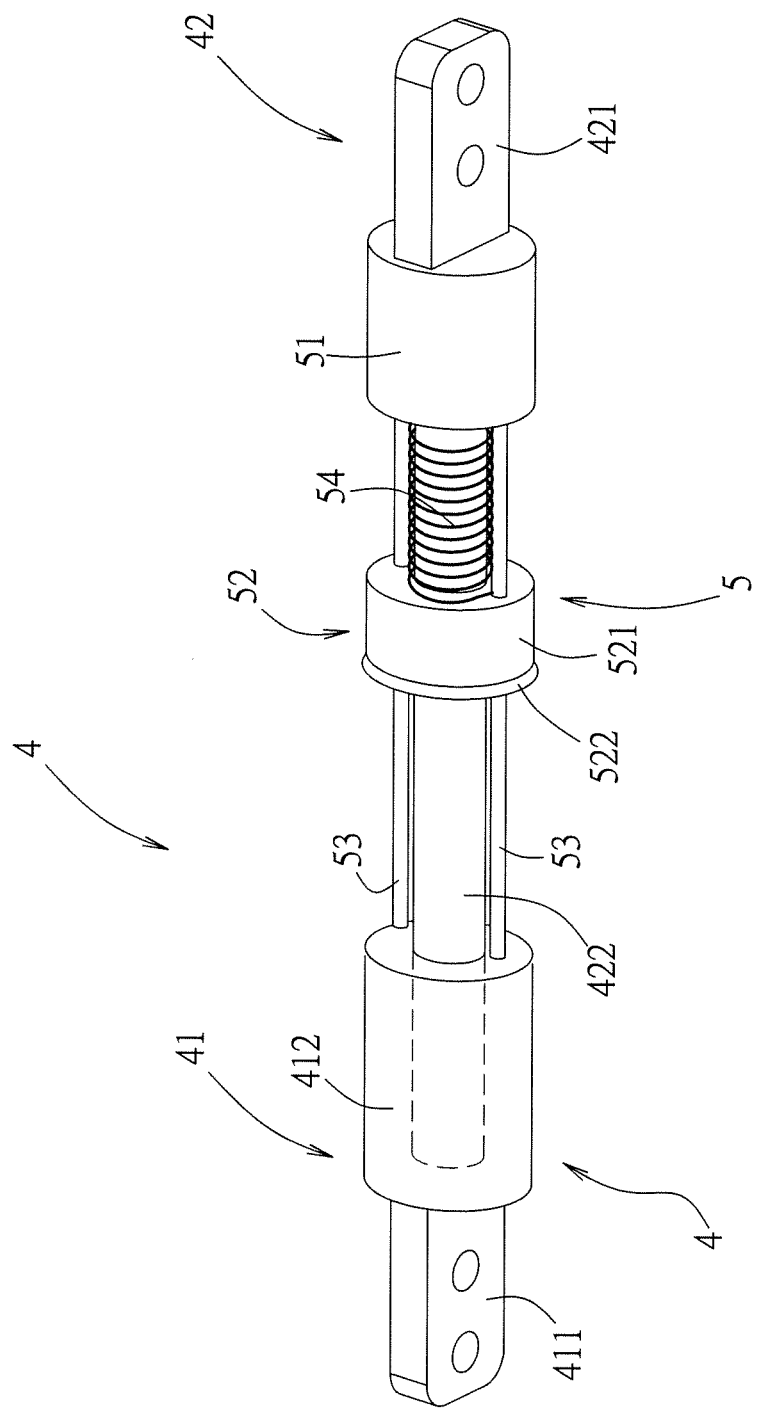
FIG. 7 is a perspective view similar to FIG. 6 but illustrating the retaining member of the retaining unit of the second embodiment in a non-retaining position.

Referring to FIGS. 6 and 7, the second embodiment of the present invention differs from the first embodiment in that: in the second embodiment, each of the retaining units 5 further includes an elastic member 54 sleeved on the corresponding pivot shaft 422 and disposed between the retaining member 52 and the driving member 51 and having the corresponding pivot shaft 422 extending therethrough. In this embodiment, the elastic member 54 is a compression spring that constantly applies an elastic force. When the retaining member 52 in the retaining position as shown in FIG. 6, the driving member 51 does not continuously produce the repulsive force, and instead relies on the elastic force provided by the elastic member 54 to apply a force on the magnet 521 of the retaining member 52, such that the washer 522 of the retaining member 52 abuts against the pivot body 412. When the retaining member 52 is in the non-retaining position as shown in FIG. 7, the driving member 51 continuously generates an attractive force with a magnitude greater than the elastic force (spring return force) of the elastic member 54 as to pull the magnet 521 to move along the pivot shaft 422 in a direction toward the driving member 51, such that the retaining member 52 is freed from abutment with the pivot body 412, and the elastic member 54 is compressed between the driving member 51 and the retaining member 52. Characteristics, material properties and operation of other components in this embodiment are similar to those of the first embodiment, and will not be described further for the sake of brevity.

In summary, by monitoring the user's interaction with the touch control screen 3 through the gravity sensor 62, the second controller 63 and the position sensor 64, and sending relevant signals to the first controller 61, which then controls the driving member 51 to drive the retaining member 52 to move between the retaining position and the non-retaining position. It can be ensured that, while the user is operating the touch control screen 3, the touch control screen 3 will not rotate relative to the host 2. Moreover, while the touch control screen 3 is not in use, the user can easily rotate the touch control screen 3 relative to the host 2.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electronic apparatus having a touch control screen, comprising:
    a host;
    a touch control screen;
    a pivot unit including a first pivot member connected to one of said host and said touch control screen, and a second pivot member connected to the other one of said host and said touch control screen, said first pivot member and said second pivot member being coupled pivotally and enabling said touch control screen to be pivoted relative to said host between a folded position and an expanded position;
    a retaining unit disposed between said first pivot member and said second pivot member and including a driving member and a retaining member, said driving member being electrically operable to drive said retaining member to move between a retaining position and a non-retaining position, said retaining member abutting against one of said first pivot member and said second pivot member in the retaining position, and being freed from abutment with said one of said first pivot member and said second pivot member in the non-retaining position; and
    a control unit coupled electrically to said touch control screen and said driving member, said control unit controlling, according to an operation signal corresponding to a status of said touch control screen, said driving member to drive said retaining member to either move to the retaining position for resisting rotation of said touch control screen relative to said host, or move to the non-retaining position for not resisting rotation of said touch control screen relative to said host,
    wherein:
    said first pivot member has a first connecting base connected to said one of said host and said touch control screen, and a pivot body connected to said first connecting base,
    said second pivot member has a second connecting base connected to the other one of said host and said touch control screen, and a pivot shaft having one end portion connected to said second connecting base, and another end portion in tight sleeving engagement with said pivot body,
    said pivot body and said pivot shaft are rotatable relative to each other,
    said pivot shaft extends through said retaining member,
    said retaining member includes a magnet and a washer disposed at one side of said magnet that faces said pivot body;
    said driving member is an electromagnet controlled by said control unit to generate one of an attractive force and a repulsive force that acts on said magnet; and
    said washer abuts against said pivot body when said retaining member is in the retaining position so as to generate a friction force that is between said washer and said pivot body, the friction force resisting rotation of said pivot shaft and said pivot body relative to each other.

2. The electronic apparatus having a touch control screen as claimed in claim 1, wherein said control unit includes a first controller that is disposed at said host and that is coupled electrically to said touch control screen and said driving member, said first controller controlling said driving member to drive said retaining member to move to the retaining position when said first controller determines that said touch control screen is being operated by a user, and controlling said driving member to drive said retaining member to move to the non-retaining position when said first controller determines that said touch control screen is being rotated relative to the host by the user.

3. The electronic apparatus having a touch control screen as claimed in claim 2, wherein said control unit further includes a second controller disposed at said touch control screen, and coupled electrically to said first controller and said touch control screen, said second controller monitoring the status of said touch control screen and transmitting a touch control signal generated by said touch control screen to said first controller to serve as the operation signal.

4. The electronic apparatus having a touch control screen as claimed in claim 3, wherein said control unit further includes a gravity sensor disposed at said touch control screen and coupled electrically to said first controller, said first controller determining that said touch control screen is being rotated relative to said host by the user when a signal received by said first controller from said gravity sensor indicates that said touch control screen is rotated relative to said host by an angle larger than a predetermined value.

5. The electronic apparatus having a touch control screen as claimed claim 4, wherein said control unit further includes a position sensor disposed at said host and coupled electrically to said first controller, said position sensor monitoring the position of said touch control screen relative to said host and transmitting a signal to said first controller when said touch control screen is disposed in the folded position, said first controller controlling said driving member to drive said retaining member to move to the non-retaining position in response to the signal from said position sensor.

6. The electronic apparatus having a touch control screen as claimed in claim 1, wherein said retaining unit further includes an elastic member disposed between said retaining member and said driving member and having said pivot shaft extending therethrough.

7. The electronic apparatus having a touch control screen as claimed in claim 6, wherein said elastic member is a compression spring.

8. The electronic apparatus having a touch control screen as claimed in claim 1, wherein said pivot body is formed with a shaft hole, and said another end portion of said pivot shaft extends fittingly and rotatably into said shaft hole.

9. The electronic apparatus having a touch control screen as claimed in claim 1, wherein said retaining member is disposed to be movable along but not rotatable relative to said pivot shaft.

* * * * *